US010750082B2

(12) United States Patent
Takahashi et al.

(10) Patent No.: US 10,750,082 B2
(45) Date of Patent: Aug. 18, 2020

(54) EVALUATION DEVICE

(71) Applicant: Komatsu Ltd., Tokyo (JP)

(72) Inventors: Hidemi Takahashi, Naka-gun (JP); Susumu Kozumi, Isehara (JP)

(73) Assignee: KOMATSU LTD., Tokyo (JP)

( * ) Notice: Subject to any disclaimer, the term of this patent is extended or adjusted under 35 U.S.C. 154(b) by 25 days.

(21) Appl. No.: 15/314,979

(22) PCT Filed: Mar. 28, 2016

(86) PCT No.: PCT/JP2016/059978
§ 371 (c)(1),
(2) Date: Nov. 30, 2016

(87) PCT Pub. No.: WO2016/137016
PCT Pub. Date: Sep. 1, 2016

(65) Prior Publication Data
US 2017/0280048 A1    Sep. 28, 2017

(51) Int. Cl.
*H04N 5/232* (2006.01)
*H04N 7/18* (2006.01)
*E02F 9/26* (2006.01)
*G09B 19/16* (2006.01)
*E02F 3/32* (2006.01)

(52) U.S. Cl.
CPC ......... *H04N 5/23222* (2013.01); *E02F 9/261* (2013.01); *G09B 19/167* (2013.01); *H04N 7/183* (2013.01); *B60Y 2200/417* (2013.01); *E02F 3/32* (2013.01); *E02F 9/26* (2013.01)

(58) Field of Classification Search
CPC ..... H04N 5/23222; H04N 7/183; E02F 9/261; E02F 3/32; G09B 19/167; B60Y 2200/417

USPC ........................................................ 348/148
See application file for complete search history.

(56) References Cited

U.S. PATENT DOCUMENTS

| 9,043,098 | B2 | 5/2015 | Nomura et al. | |
|---|---|---|---|---|
| 9,332,229 | B2 | 5/2016 | Ishimoto | |
| 9,598,036 | B2 | 3/2017 | Lim et al. | |
| 2010/0245575 | A1* | 9/2010 | Mori | B60R 1/00 348/148 |
| 2013/0088593 | A1* | 4/2013 | Ishimoto | E02F 9/226 348/143 |
| 2014/0058613 | A1* | 2/2014 | Leinfelder | B62D 15/028 701/28 |

(Continued)

FOREIGN PATENT DOCUMENTS

| CN | 102947515 A | 2/2013 |
|---|---|---|
| CN | 103857852 A | 6/2014 |
| CN | 104884712 A | 9/2015 |

(Continued)

OTHER PUBLICATIONS

International Search Report and Written Opinion dated Jun. 7, 2016, issued for PCT/JP2016/059978.

*Primary Examiner* — Thai Q Tran
*Assistant Examiner* — Nienru Yang
(74) *Attorney, Agent, or Firm* — Locke Lord LLP

(57) ABSTRACT

An evaluation device includes a first display control unit that displays imaging data acquired by an imaging device on a display screen of a display device, and a second display control unit that displays on the display screen a guide display based on work vehicle data on a work vehicle imaged, to determine an imaging position of the imaging device.

14 Claims, 11 Drawing Sheets

(56) References Cited

U.S. PATENT DOCUMENTS

2014/0100712 A1\* 4/2014 Nomura .................... E02F 3/32
　　　　　　　　　　　　　　　　　　　　　　701/1
2015/0343976 A1   12/2015 Lim et al.

FOREIGN PATENT DOCUMENTS

| JP | 2005-121343 A | 5/2005 |
| JP | 2009-287298 A | 12/2009 |
| JP | 2014-125865 A | 7/2014 |
| WO | 2014/103683 A1 | 7/2014 |
| WO | 2016/013490 A1 | 1/2016 |

\* cited by examiner

10,750,082 B2

EVALUATION DEVICE

FIELD

The present invention relates to an evaluation device.

BACKGROUND

Patent Literature 1 discloses a work vehicle used for excavation work at construction sites.

CITATION LIST

Patent Literature

Patent Literature 1: JP 2009-287298 A

SUMMARY

Technical Problem

To evaluate the skill of an operator who operates a work vehicle or to inspect a work vehicle, the movement of the work vehicle is imaged by an imaging device such as a camera or a video camera in some cases. In those cases, it is required to secure the safety of a person who takes images and to avoid contact between an imaging device and a working machine of a work vehicle. There is also a demand for a technology that prevents the position of a person who takes images or an imaging device from varying depending on imaging timing or from person to person who takes images, to allow imaging to be performed in a proper imaging position. Specifically, when the skill of an operator who operates a work vehicle is evaluated, based on images taken by an imaging device, comparison troubles can occur in the skill evaluation if imaging is not performed under a specific imaging condition. Further, when an inspection of a work vehicle (e.g., a check of the moving speed of a working machine) is performed, based on images taken by an imaging device, there is a fear that determination of the presence or absence of a malfunction of the work vehicle is not performed correctly if imaging is not performed under a specific imaging condition.

An aspect of the present invention has an object of providing an evaluation device that can perform an evaluation of an operator or an evaluation on the condition of a work vehicle by imaging the work vehicle in a proper imaging position while securing the safety of a person who takes images.

Solution to Problem

According to an aspect of the present invention, an evaluation device comprises: a first display control unit that displays imaging data acquired by an imaging device on a display screen of a display device; and a second display control unit that displays on the display screen a guide display based on work vehicle data on a work vehicle imaged, to determine an imaging position of the imaging device.

Advantageous Effects of Invention

According to an aspect of the present invention, provided is an evaluation device capable of objectively evaluating the skill of an operator of a work vehicle.

DESCRIPTION OF EMBODIMENTS

Hereinafter, embodiments of the present invention will be described with reference to the drawings, but the present invention is not limited to them. Components in the embodiments described below can be combined as appropriate. Some of the components may not be used.

<Work Vehicle>

Figure 1:
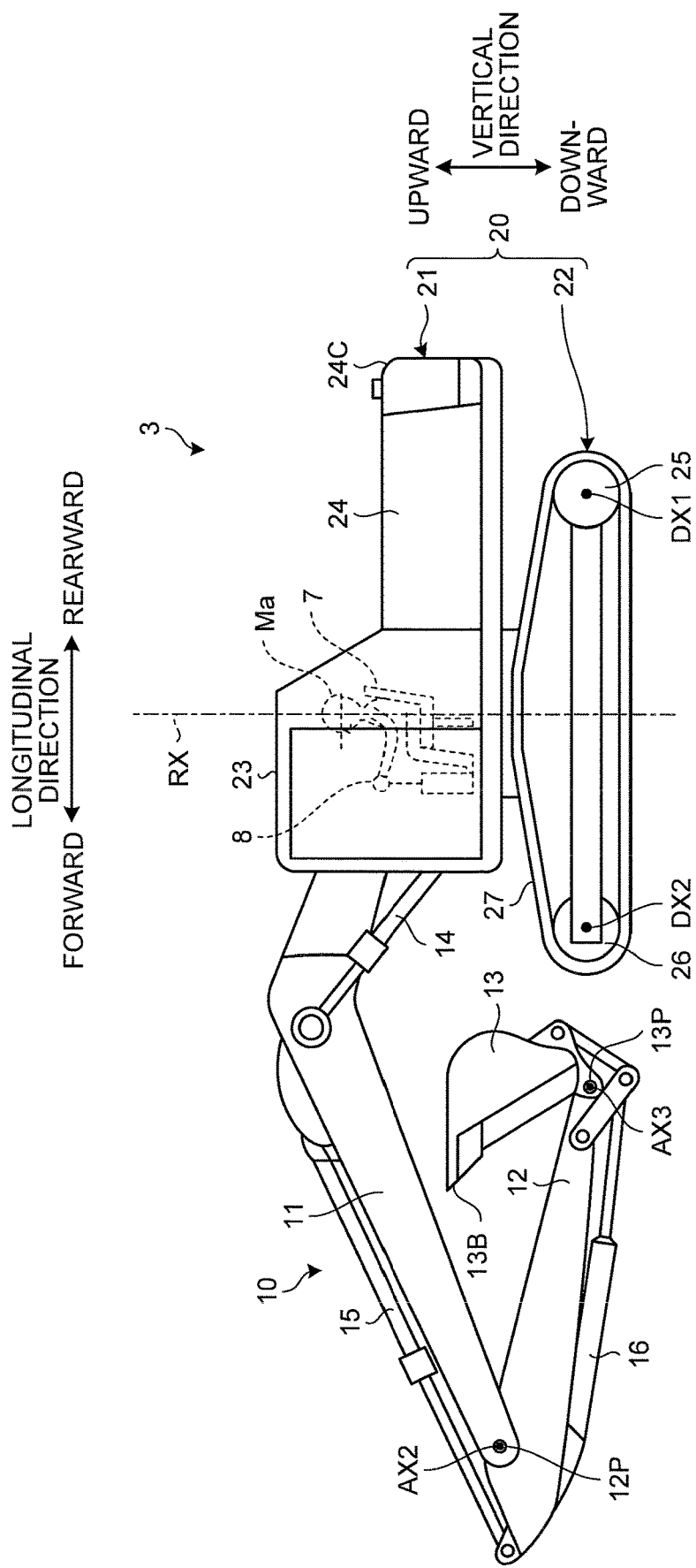
FIG. 1 is a side view illustrating an example of an excavator according to an embodiment.
Figure 2:
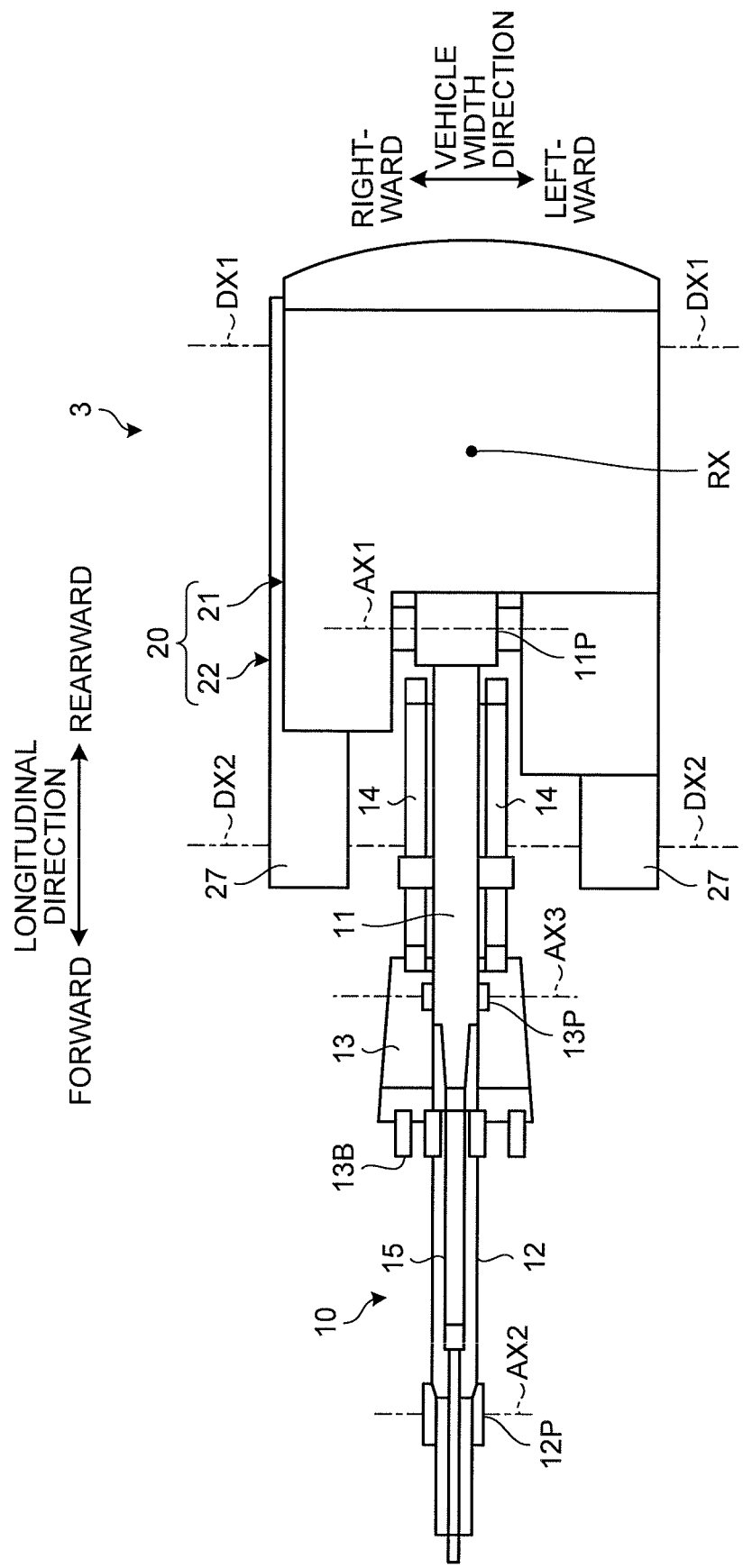
FIG. 2 is a plan view illustrating an example of the excavator according to the embodiment.

FIG. 1 is a side view illustrating an example of a work vehicle 3 according to the present embodiment. FIG. 2 is a plan view illustrating an example of the work vehicle 3 according to the present embodiment. In the present embodiment, an example where the work vehicle 3 is an excavator is described. FIG. 2 illustrates a plan view when the excavator 3 is viewed from above with a working machine 10 in a position as in FIG. 1.

The excavator 3 works at a construction site. The excavator 3 is operated by an operator Ma who has boarded the excavator 3. The operator Ma executes works at the construction site, operating the excavator 3.

As illustrated in FIGS. 1 and 2, the excavator 3 has the working machine 10 that works by hydraulic pressure, and a vehicle body 20 supporting the working machine 10. The vehicle body 20 includes an upper swing body 21 and a lower traveling body 22 supporting the upper swing body 21.

The upper swing body 21 has a cab 23, a machine house 24, and a counterweight 24C. The cab 23 includes a driver's cab. In the driver's cab, a driver's seat 7 on which the operator Ma sits, and an operating device 8 operated by the operator Ma are disposed. The operating device 8 includes working levers for operating the working machine 10 and the upper swing body 21, and traveling levers for operating the lower traveling body 22. The working machine 10 is operated by the operator Ma through the operating device 8. The upper swing body 21 and the lower traveling body 22 are operated by the operator Ma through the operating device 8. The operator Ma can operate the operating device 8 while seated on the driver's seat 7.

The lower traveling body 21 has drive wheels 25 called sprockets, idler wheels 26 called idlers, and belts 27 supported on the drive wheels 25 and the idler wheels 26. The drive wheels 25 are actuated by power generated by a drive source such as a hydraulic motor. The drive wheels 25 are rotated by operating the traveling levers of the operating device 8. The drive wheels 25 rotate about a rotation axis DX1. The idler wheels 26 rotate about a rotation axis DX2. The rotation axis DX1 and the rotation axis DX2 are parallel. By the drive wheels 25 rotating to rotate the belts 27, the excavator 3 travels forward or backward, or turns.

The upper swing body 21 can swing about a pivot RX in a state of being supported on the lower traveling body 22.

The working machine 10 is supported relatively movably on the upper swing body 21 of the vehicle body 20. The working machine 10 has a boom 11 attached to the upper swing body 21, an arm 12 attached to the boom 11, and a bucket 13 attached to the arm 12. The bucket 13 has a plurality of blades in a protruded shape, for example. A plurality of blade edges 13B constituting front edges of the blades is provided. The blade edges 13B of the bucket 13 may be a front edge of a straight-shaped blade provided to the bucket 13.

The boom 11 is attached to the upper swing body 21 via a boom pin 11P. The boom 11 is supported on the upper swing body 21 movably about a rotation axis AX1. The arm 12 is attached to the boom 11 via an arm pin 12P. The arm 12 is supported on the boom 11 movably about a rotation axis AX2. The bucket 13 is attached to the arm 12 via a bucket pin 13P. The bucket 13 is supported on the arm 12 movably about a rotation axis AX3. The rotation axis AX1, the rotation axis AX2, and the rotation axis AX3 are parallel in a longitudinal direction. The definition of the longitudinal direction will be described below.

In the description below, a direction in which the axes of the rotation axes AX1, AX2, and AX3 extend is referred to as a vehicle width direction of the upper swing body 21 as appropriate, a direction in which the axis of the pivot RX extends is referred to as a vertical direction of the upper swing body 21 as appropriate, and a direction orthogonal to both the rotation axes AX1, AX2, and AX3 and the pivot RX is referred to as a longitudinal direction of the upper swing body 21 as appropriate.

In the present embodiment, with the operator Ma seated on the driver's seat 7 as a reference, a direction in which the working machine 10 including the bucket 13 is present is a forward direction, and a direction opposite to the forward direction is a rearward direction. One vehicle width direction is a rightward direction, and a direction opposite to the rightward direction, that is, a direction in which the cab 23 is present is a leftward direction. The bucket 13 is disposed forward of the upper swing body 21. The plurality of blade edges 13B of the bucket 13 is disposed in the vehicle width direction. The upper swing body 21 is disposed above the lower traveling body 22.

The working machine 10 is actuated by hydraulic cylinders. The excavator 3 has a boom cylinder 14 for moving the boom 11, an arm cylinder 15 for moving the arm 12, and a bucket cylinder 16 for moving the bucket 13. When the boom cylinder 14 extends or contracts, the boom 11 moves about the rotation axis AX1, and the distal end of the boom 11 travels in a vertical direction. When the arm cylinder 15 extends or contracts, the arm 12 moves about the rotation axis AX2, and the distal end of the arm 12 travels in a vertical direction or in a longitudinal direction. When the bucket cylinder 16 extends or contracts, the bucket 13 moves about the rotation axis AX3, and the blade edges 13B of the bucket 13 travel in a vertical direction or in a longitudinal direction. The hydraulic cylinders of the working machine 10 including the boom cylinder 14, the arm cylinder 15, and the bucket cylinder 16 are operated by the working levers of the operating device 8. By the hydraulic cylinders of the working machine 10 extending and contracting, the position of the working machine 10 is changed.

<Operating Device>

Figure 3:
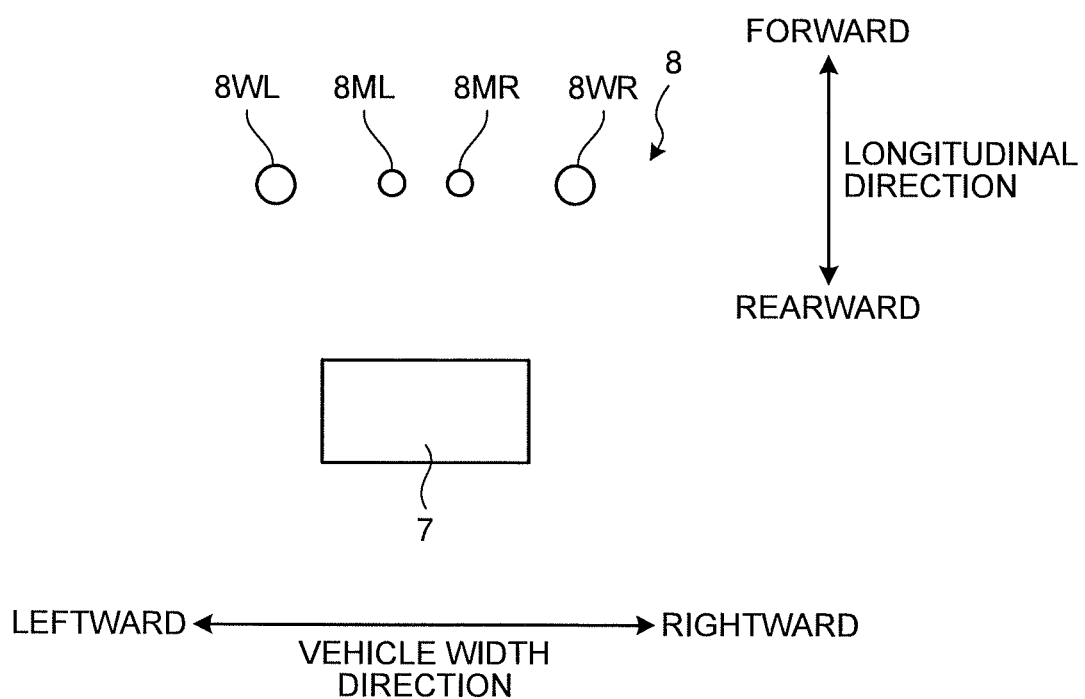
FIG. 3 is a diagram schematically illustrating an example of an operating device according to the embodiment.

Next, the operating device 8 according to the present embodiment will be described. FIG. 3 is a diagram schematically illustrating an example of the operating device 8 according to the present embodiment. The working levers of the operating device 8 include a right working lever 8WR disposed rightward of the center of the driver's seat 7 in the vehicle width direction, and a left working lever 8WL disposed leftward of the center of the driver's seat 7 in the vehicle width direction. The traveling levers of the operating device 8 include a right traveling lever 8MR disposed rightward of the center of the driver's seat 7 in the vehicle width direction, and a left traveling lever 8ML disposed leftward of the center of the driver's seat 7 in the vehicle width direction.

When the right working lever 8WR in a neutral position is tilted forward, the boom 11 moves downward, and when tilted rearward, the boom 11 moves upward. When the right working lever 8WR in the neutral position is tilted rightward, the bucket 13 performs a dumping action, and when tilted leftward, the bucket 13 performs a raking-in action.

When the left working lever 8WL in a neutral position is tilted rightward, the upper swing body 21 swings rightward, and when tilted leftward, the upper swing body 21 swings leftward. When the left working lever 8WL in the neutral position is tilted rearward, the arm 12 performs a raking-in action, and when tilted forward, the arm 12 performs an extending action.

When the right traveling lever 8MR in a neutral position is tiled forward, the right crawler 27 moves forward, and when tilted rearward, the right crawler 27 moves backward. When the left traveling lever 8ML in a neutral position is tilted forward, the left crawler 27 moves forward, and when tilted rearward, the left crawler 27 moves backward.

Operation patterns on the movement relationships between the tilting directions of the right working lever 8WR and the left working lever 8WL and the swinging directions of the working machine 10 or the upper swinging pair 21 do not need to be the above-described relationships.

<Hardware Configuration>

In the present embodiment, a worker Mb different from the operator Ma performs a work at the construction site. The worker Mb performs a supplementary work at the construction site, for example. The operator Ma or the worker Mb has a portable device 6 including a computer system. The portable device 6 includes a portable computer such as a smartphone or a tablet personal computer.

Figure 4:
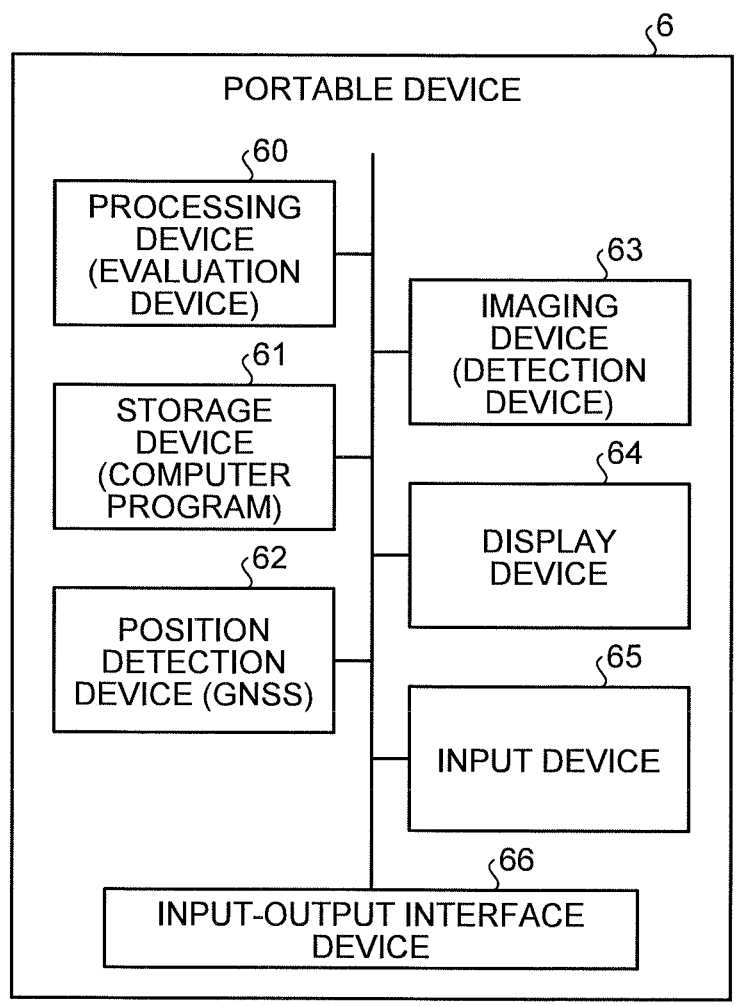
FIG. 4 is a diagram schematically illustrating an example of a hardware configuration of an evaluation system according to the embodiment.

FIG. 4 is a diagram schematically illustrating an example of a hardware configuration of the portable device 6 according to the present embodiment. The portable device 6 includes a computer system. The portable device 6 has a processing device 60, a storage device 61, a position detection device 62 for detecting the position of the portable device 6, an imaging device 63, a display device 64, an input device 65, and an input-output interface device 66.

The processing device 60 includes a microprocessor such as a central processing unit (CPU). The storage device 61 includes memory and storage such as read-only memory (ROM) or random-access memory (RAM). The processing device 60 performs arithmetic processing according to a computer program stored in the storage device 61.

The position detection device 62 detects the absolute position indicating the position of the portable device 6 in a global coordinate system, using Global Navigation Satellite System (GNSS).

The imaging device 63 has a video camera function capable of acquiring moving image data of a subject, and a still camera function capable of acquiring still image data of a subject. The imaging device 63 is intended to acquire imaging data, and has an optical system and an image pickup device for acquiring imaging data of a subject through the optical system. The image pickup device includes a charge-coupled device (CCD) image sensor or a complementary metal-oxide-semiconductor (CMOS) image sensor.

The imaging device 63 can image the excavator 3. The imaging device 63 functions as a detection device for detecting movement data indicating the movement of the working machine 10 of the excavator 3. The imaging device 63 acquires imaging data, movement data of the working machine 10, to be able to acquire travel data of the working machine 10 including at least one of the travel locus, travel speed, and travel time of the working machine 10. Imaging data of the working machine 10 includes moving image data and/or still image data of the working machine 10.

The display device 64 includes a flat panel display such as a liquid crystal display (LCD) or an organic electroluminescence display (OELD). The input device 65 generates input data by being operated. In the present embodiment, the input device 65 includes a touch sensor provided in a display screen of the display device 64. The display device 64 includes a touch panel.

The input-output interface device 66 performs data communications with the processing device 60, the storage device 61, the position detection device 62, the imaging device 63, the display device 64, and the input device 65.

<Portable Device>

Figure 5:
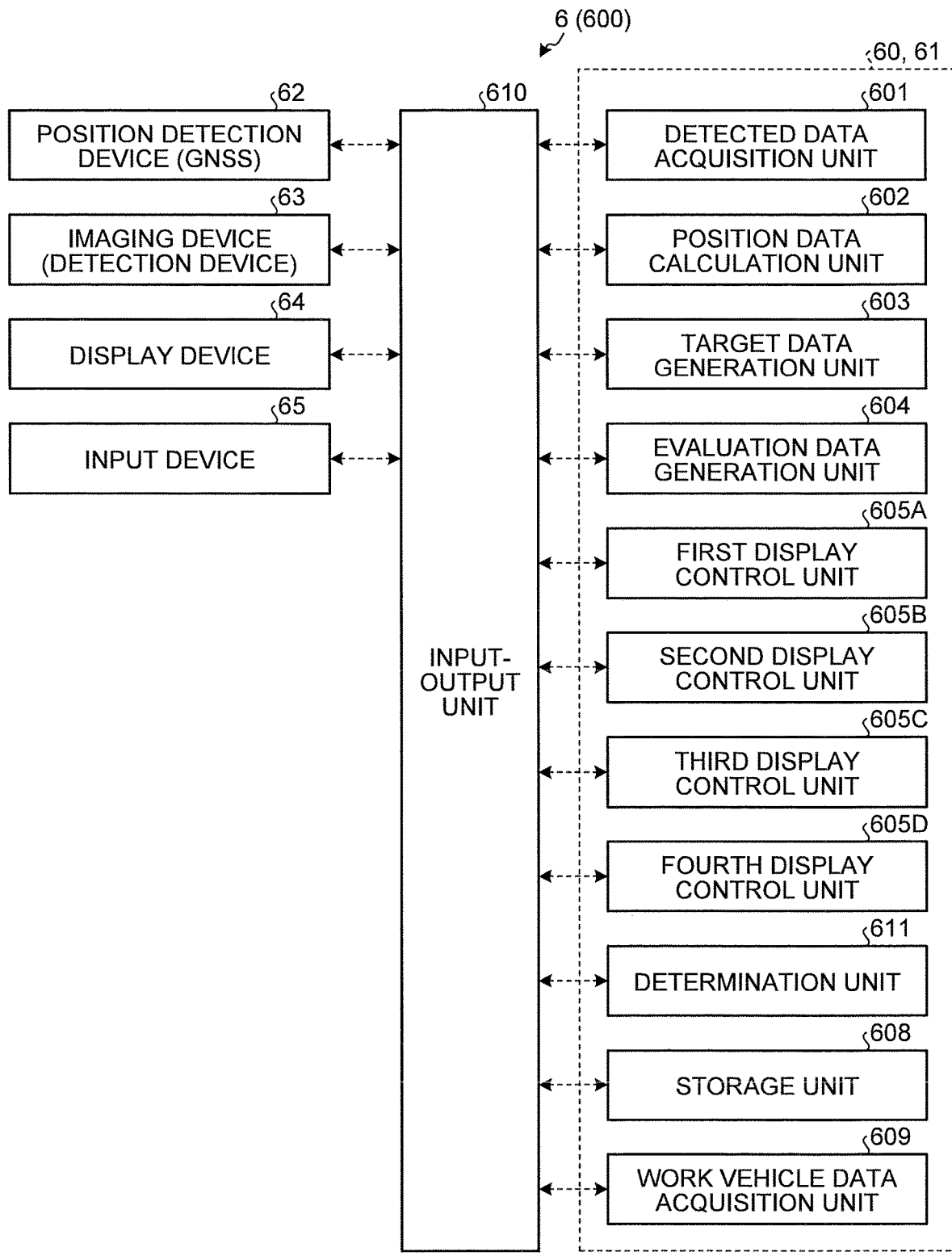
FIG. 5 is a functional block diagram illustrating an example of a portable device according to the embodiment.

Next, the functions of the portable device 6 according to the present embodiment will be described. FIG. 5 is a functional block diagram illustrating an example of the portable device 6 according to the present embodiment. The portable device 6 functions as an evaluation device 600 that performs an evaluation of the action of the excavator 3 and/or an evaluation of the skill of the operator Ma who operates the excavator 3. The functions of the evaluation device 600 are fulfilled by the processing device 60 and the storage device 61.

The evaluation device 600 has a detected data acquisition unit 601 for acquiring imaging data of the excavator 3 taken by the imaging device 63, a position data calculation unit 602 for calculating position data of the working machine 10 based on imaging data of the excavator 3 taken by the imaging device 63, a target data generation unit 603 for generating target data including a target travel condition of the working machine 10, an evaluation data generation unit 604 for generating evaluation data based on imaging data and target data, a first display control unit 605A for displaying display data including imaging data of the excavator 3 and evaluation data on the display screen of the display device 64, a second display control unit 605B for displaying a guide line 70 on the display screen of the display device 64, a third display control unit 605C for displaying instruction data 75 to give instructions to move the imaging device 63 away from the excavator 3 by a specified distance on the display screen of the display device 64, a fourth display control unit 605D for displaying positioning status data 71 indicating that the vehicle body 20 has been positioned according to the guide line 70 on the display screen of the display device 64, a determination unit 611 for determining whether the vehicle body 20 has been positioned according to the guide line 70 or not, a display control unit 605 for controlling the display device 64, a storage unit 608, a work vehicle data acquisition unit 609 for acquiring work vehicle data including the size (dimensions) of the excavator 3 and the movable range of the working machine 10, and an input-output unit 610. The evaluation device 600 performs data communications via the input-output unit 610.

The detected data acquisition unit 601 acquires imaging data of the excavator 3 having the working machine 10. By the operator Ma operating the operating device 8, the working machine 10 moves. By the imaging device 63 imaging the movement of the working machine 10, imaging data is acquired.

The position data acquisition unit 602 calculates position data of the working machine 10 from imaging data of the working machine 10 taken by the imaging device 63. The position data acquisition unit 602 calculates position data of the working machine 10 from imaging data of the working machine 10, using a pattern matching method, for example.

The target data generation unit 603 generates target data including a target travel locus of the working machine 10 from imaging data of the working machine 10 taken by the imaging device 63.

The evaluation data generation unit 604 generates evaluation data based on imaging data acquired by the detected data acquisition unit 601 and target data generated by the target data generation unit 602. Evaluation data includes evaluation data of the movement of the working machine 10 and/or evaluation data of the operator Ma who has operated the working machine 10 through the operating device 8.

The first display control unit 605A displays imaging data of the excavator 3 acquired by the imaging device 63 on the display screen of the display device 64. The first display control unit 605A generates display data from detected data and target data for display on the display device 64. The first display control unit 605A generates display data from evaluation data for display on the display device 64.

The second display control unit 605B displays on the display screen of the display device 64 the guide line 70 that is based on work vehicle data on the excavator 3 imaged and is a guide display to determine the imaging position of the imaging device 63. The second display control unit 605B displays the guide line 70 in such a display form that when the vehicle body 30 of the excavator 3 is positioned according to the guide line 70 on the display screen of the display device 64, the entire excavator 3 can be imaged by the imaging device 63 even when the working machine 10 of the excavator 3 moves to a limit position in the movable range. The second display control unit 605B displays the guide line 70 in such a display form that when the vehicle body 20 of the excavator 3 is positioned according to the guide line 70 on the display screen of the display device 64, the imaging position of the imaging device 63 is at a specified distance from the excavator 3.

The second display control unit 605B displays on the display screen of the display device 64 the guide line 70 in a display form in which the size (dimensions) and position thereof are fixed on the display screen of the display device 64. The guide line 70 is generated based on work vehicle data including the size (dimensions) of the excavator 3 and the movable range of the working machine 10 relative to the vehicle body 20.

The third display control unit 605C displays the instruction data 75 on the display screen of the display device 64. The instruction data 75 is intended to give instructions to move the imaging device 63 away from the excavator 3 by a specified distance on the side of a specific part of the vehicle body 20 of the excavator 3.

The fourth display control unit 605D displays the positioning status data 71 on the display screen of the display device 64. The positioning status data 71 is intended to indicate that the vehicle body 20 has been positioned according to the guide line 70 on the display screen of the display device 64 when it is determined that the positioning has been done.

The determination unit 611 performs image processing on imaging data of the vehicle body 20 to determine whether or not the vehicle body 20 of the excavator 3 indicated by imaging data of the excavator 3 displayed on the display screen of the display device 64 has been positioned according to the guide line 70 displayed on the display screen of the display device 64.

The storage unit 608 stores various data. The storage unit 608 stores a computer program for implementing an evaluation method according to the present embodiment. In the present embodiment, the storage unit 608 stores work vehicle data.

The work vehicle data acquisition unit 609 acquires from the storage unit 608 work vehicle data including the size (dimensions) of the excavator 3 and the movable range of the working machine 10 relative to the vehicle body 20. The size (dimensions) of the excavator 3 is data defining a size (dimensions) to form at least the outline of the upper swing body 21 or the outline of the lower traveling body 22. In the present embodiment, described is a case where data defining a size (dimensions) to form the outline of the upper swing body 21 and the outline of the lower traveling body 22 is used as data indicating the dimensions of the excavator 3 included in the work vehicle data. As data indicating the dimensions of the excavator 3 included in the work vehicle data, only data defining a size (dimensions) to form the outline of the upper swing body 21 may be used to generate the guide line 70 indicating the outline of the vehicle body 20 to display the guide line 70 on the display screen of the display device 64.

In place of the guide line 70, a figure indicating the shape of the vehicle body 20 including the outline of the vehicle body 20 may be displayed. A guide display is intended to determine the imaging position. A guide line or such a figure is displayed to guide an imaging position. In the present embodiment, a case where the guide line 70 is used as a guide display is described.

The movable range of the working machine 10 is data defining the range of positions that the working machine 10 can take by extending and contracting the hydraulic cylinders of the working machine 10. As work vehicle data indicating a movable range, data indicating a distance in the most extended state of the working machine 10, for example, when the distance between the blade edges 13B and the pivot RX becomes longest (a maximum swing radius described below) can be used. In the present embodiment, work vehicle data is stored in the storage unit 608. The work vehicle data acquisition unit 609 acquires work vehicle data from the storage unit 608.

Work vehicle data may be input from the input device 65. The work vehicle data acquisition unit 609 may acquire work vehicle data from the input device 65.

Guide display data indicating the guide line 70 generated based on work vehicle data may be stored in the storage unit 608, and the second display control unit 605B may display the guide line 70 on the display screen of the display device 64, based on the guide display data stored in the storage unit 608. Guide display data may be input through the input device 65, and the second table control unit 605B may display the guide line 70 on the display screen of the display device 64, based on the guide display data input through the input device 65.

<Evaluation Method>

Figure 6:
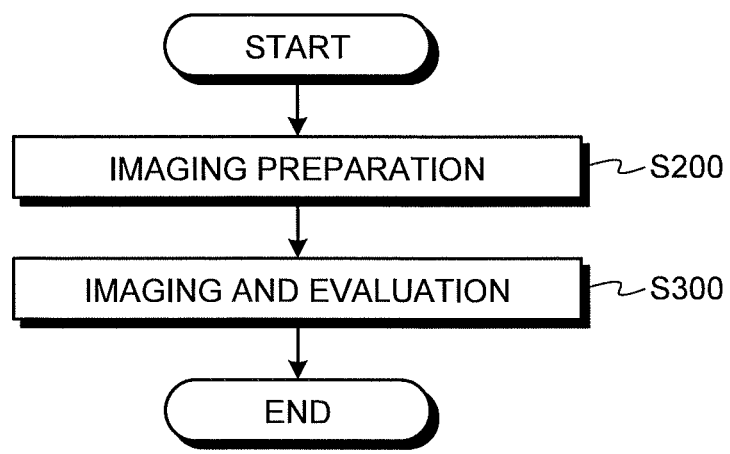
FIG. 6 is a flowchart illustrating an example of an evaluation method according to the embodiment.

Next, a method of evaluating the skill of the operator Ma according to the present embodiment will be described. FIG. 6 is a flowchart illustrating an example of the evaluation method according to the present embodiment.

In the present embodiment, the evaluation method includes a step of performing a preparation for imaging the excavator 3 by the imaging device 63 (S200), and a step of imaging the excavator 3 using the imaging device 63 and evaluating the skill of the operator Ma (S300).

(Imaging Preparation)

A preparation for imaging the excavator 3 by the imaging device 63 is performed (step S200). In the present embodiment, the imaging preparation includes determination of the imaging position of the imaging device 63 relative to the excavator 3.

In order to fix an imaging condition of the excavator 3, as an imaging preparation, processing for determining the relative position of the imaging device 63 to image the excavator 3 to the excavator 3 as described below is performed.

Figure 7:
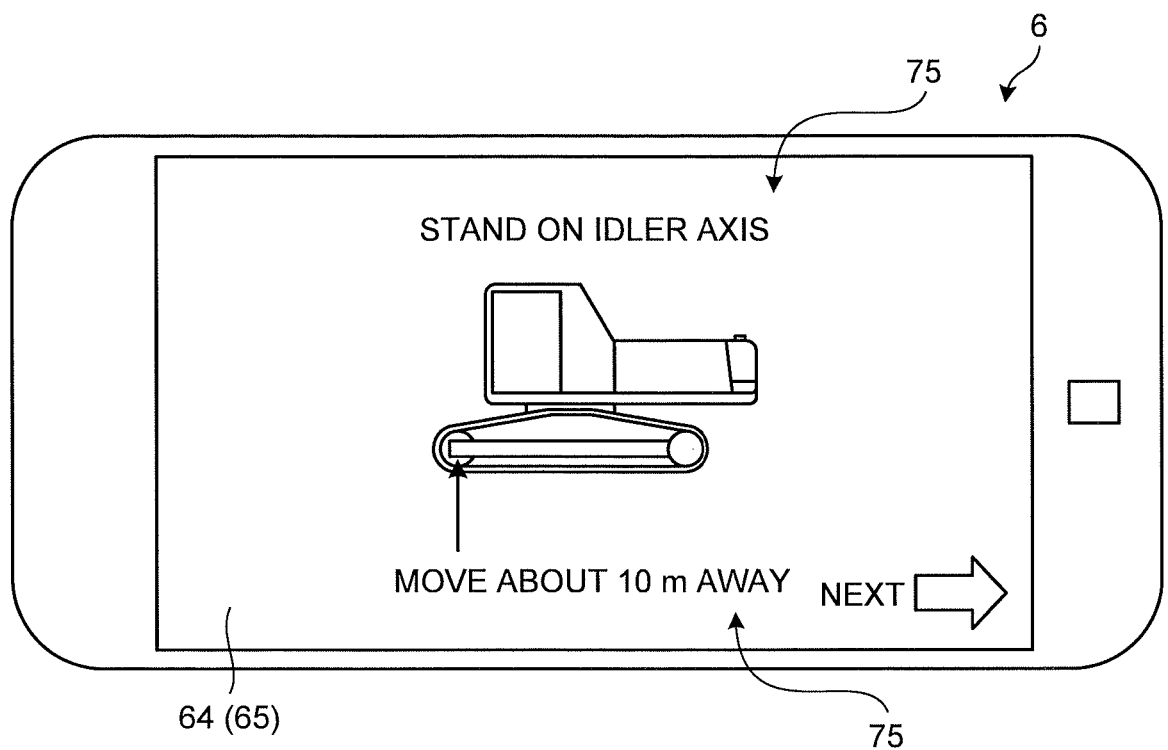
FIG. 7 is a diagram for explaining an example of an imaging position determination method according to the embodiment.
Figure 8:
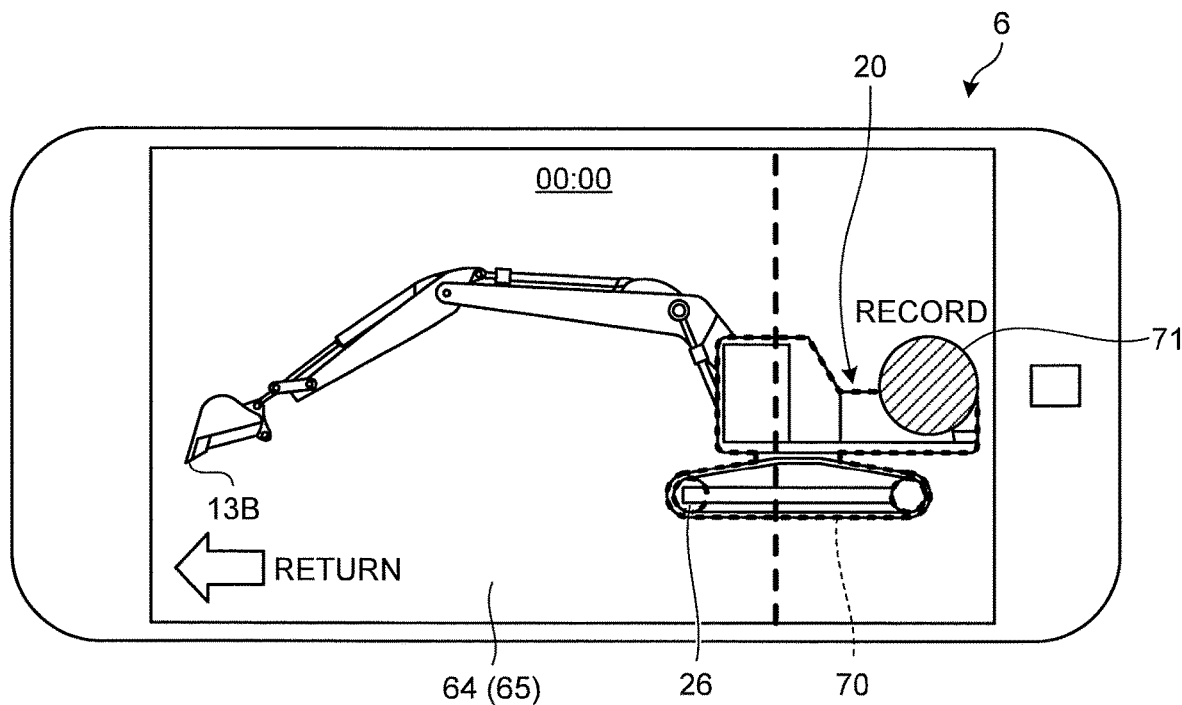
FIG. 8 is a diagram for explaining an example of an imaging method according to the embodiment.
Figure 9:
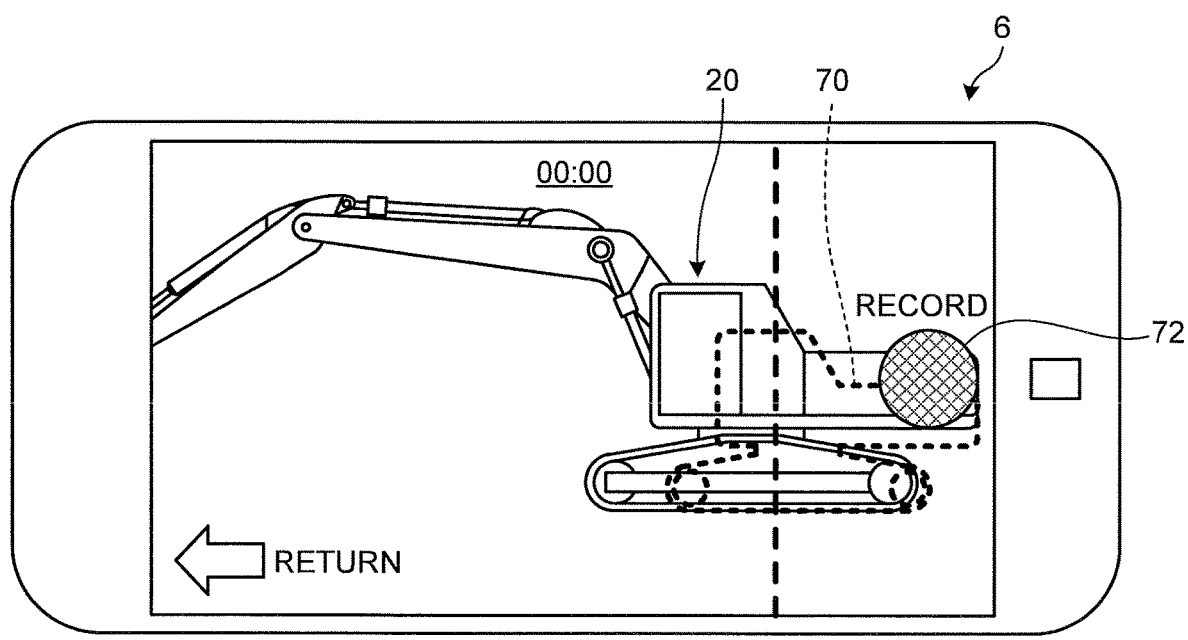
FIG. 9 is a diagram for explaining an example of the imaging method according to the embodiment.

FIGS. 7 to 9 are diagrams for explaining an example of an imaging position determination method according to the present embodiment. By the operator Ma or the worker Mb operating the input device 65 of the portable device 6, the computer program stored in the storage unit 608 is started. By the computer program being started, the portable device 6 transitions to an imaging preparation mode. In the imaging preparation mode, the zooming function of the optical system of the imaging device 63 is restricted. The excavator 3 is imaged by the imaging device 63 with a fixed specified imaging magnification. In the present embodiment, described is a case where, when the excavator 3 is viewed from the left side, as illustrated in FIG. 1, the upper swing body 21 and the lower traveling body 22 are positioned so that the idler wheels 26 are disposed closer to the working machine 10, and the drive wheels 25 are disposed farther from the working machine 10. In other words, the upper swing body 21 and the lower traveling body 22 are positioned so that the rotation axes AX1, AX2, and AX3 of the working machine 10 and the rotation axes DX1 and DX2 of the lower traveling body 22 are parallel in space.

Alternatively, when the excavator 3 is viewed from the left side, unlike in FIG. 1, the upper swing body 21 and the lower traveling body 22 may be positioned so that the drive wheels 25 are disposed closer to the working machine 10, and the idler wheels 26 are disposed farther from the working machine 10. In this case also, the upper swing body 21 and the lower traveling body 22 are positioned so that the rotation axes AX1, AX2, and AX3 of the working machine 10 and the rotation axes DX1 and DX2 of the lower traveling body 22 are parallel in space. In this positioning of the upper swing body 21 and the lower traveling body 22, the specific part of the vehicle body 20 described below is the drive wheel 25.

In the imaging preparation mode, as illustrated in FIG. 7, the instruction data 75 to give instructions to move the imaging device 63 away from the excavator 3 by a specified distance on the side of a specific part of the vehicle body 20 is displayed on the display device 64. In the present embodiment, the specific part of the vehicle body 20 is the idler wheel 26 also called an idler. As described above, the drive wheel 25 also called as a sprocket may be set as the specific part of the vehicle body 20. Specifically, the instruction data 75 to give instructions to move the imaging device 63 away from the excavator 3 by a specified distance on the side of the drive wheel 25 of the vehicle body 20 may be displayed on the display device 64. The specified distance is, for example, about 10 [m]. This specified distance is a distance that prevents the upper swing body 21 from contacting the imaging device 63 even when it is swung with the working machine 10 in the most extended state. A state where the working machine 10 is most extended is a state where the working machine 10 is caused to take a position by the operating device 8 operated so that the distance between the blade edges 13B and the pivot RX becomes longest. The distance between the blade edges 13B and the pivot RX in that state is referred to as a maximum swing radius. The specified distance is larger than the maximum swing radius. The third display control unit 605C displays the instruction data 75 to give instructions to move the imaging device 63 away from the excavator 3 by the specified distance on the left side of the idler wheel 26 of the vehicle body 20 on the display screen of the display device 64. In the present embodiment, the instruction data 75 includes figure data representing the vehicle body 20, character data "Stand on idler axis," and character data "Move about 10 m away."

When a portion "Next" displayed on the display screen of the display device 64 illustrated in FIG. 7 is pressed, the guide line 70 is displayed on the display screen of the display device 64 as illustrated in FIG. 8. The second display control unit 605B fixes the position and the size (dimensions) in which and with which the guide line 70 is displayed on the display screen of the display device 64 to display the guide line 70 based on the work vehicle data on the display screen of the display device 64. Specifically, the guide line 70 is a line indicating the outline of the vehicle body 20 of the excavator 3 (e.g., the outline of the upper swing body 21 and the lower traveling body 22) as described below, and is graphic data displayed by a broken line as illustrated in FIG. 8 stored in the storage unit 608 in advance. The work vehicle data includes the dimensions of the excavator 3. The guide line 70 indicates the outline of the vehicle body 20 of the excavator 3 on a predetermined scale, based on the dimensions of the excavator 3 included in the work vehicle data. The guide line 70 may be displayed by a solid line in place of the broken line, and further may be displayed highlighted in red, for example.

The graphic data to be the guide line 70 may be stored in the storage unit 608 in advance, or may be generated by the second display control unit 605B, using the work vehicle data acquired from the storage unit 608 or the input device 65 by the work vehicle data acquisition unit 609.

The operator Ma is seated on the driver's seat 7 of the excavator 3. On the other hand, the portable device 6 is held by the worker Mb. The worker Mb acquires imaging data of the excavator 3 by the imaging device 63 of the portable device 6. As illustrated in FIG. 8, display data generated based on the imaging data of the excavator 3 is displayed on the display device 64 of the portable device 6. Specifically, as illustrated in FIG. 8, an image capturing the excavator 3 in front of the imaging device 63 as a detection device is displayed on the display device 64. The display screen of the display device 64 is disposed on one side of the portable device 6. FIG. 8 illustrates the appearance of the portable device 6 viewed from the one side. The optical system of the imaging device 63 is disposed on the other side of the portable device 6. In the present embodiment, a case where the portable device 6 into which the imaging device 63 and the display device 64 are integrated is used is described. Alternatively, the imaging device 63 illustrated in FIG. 5 may be separate from the display device 64 including the input device 65 so that they can perform wired or wireless communications with each other. In that case, imaging data taken by the imaging device 63 as a detection device is transmitted to the detected data acquisition unit 601 located away from the imaging device 63, so that the detected data acquisition unit 601 acquires the imaging data. Then, the worker Mb can check the imaging data by the display device 64 including the input device 65 located away from the excavator 3. Checking imaging data of the excavator 3 on the display device 64, the worker Mb can image the excavator 3 by the imaging device 63.

The guide line 70 indicates the outline of the vehicle body 20 when the excavator 3 is viewed from the left side. In the present embodiment, the guide line 70 indicates the outline of the vehicle body 20 viewed from the left side when the upper swing body 21 and the lower traveling body 22 are positioned so that the rotation axes AX1, AX2, and AX3 of the working machine 10 and the rotation axes DX1 and DX2 of the lower traveling body 22 are parallel in space. In other words, the outline of the vehicle body 20 is the outline of the vehicle body 20 that can be captured by the imaging device 63 when the imaging device 63 is disposed to image the excavator 3 with the upper swing body 21 facing forward relative to the lower traveling body 22, just from the side. A plurality of graphic data pieces may be prepared in the storage unit 608, according to the vehicle ranks or shapes of excavators 3 so that the guide line 70 can be switched by the operation of the input device 65, according to the vehicle rank or shape of an excavator 3 to be imaged.

The display control unit 605 displays the guide line 70 indicating the outline of the vehicle body 20 when the excavator 3 is viewed from the left side on the display screen of the display device 64 to fix the imaging position of the imaging device 63 relative to the excavator 3 in the imaging preparation mode. The position and size (dimensions) in which and with which the guide line 70 is displayed are fixed on the display screen of the display device 64.

The position and size (dimensions) of the guide line 70 displayed on the display screen of the display device 64 are set so that the imaging device 63 is disposed in a specified relative position to the excavator 3 when the outline of the actual vehicle body 20 displayed on the display screen of the display device 64 coincides with the outline indicated by the guide line 70 (hereinafter, the guide line 70) in a superimposed manner. The worker Mb, a person taking images, moves, holding the portable device 6, while checking imaging data of the excavator 3 (the display screen of the display device 64) to bring the outline of the vehicle body 20 being imaged by the imaging device 63 into coincidence with the guide line 70. The position of the portable device 6 when the outline of the vehicle body 20 coincides with the guide line 70 is determined as the imaging position.

The work vehicle data acquisition unit 609 acquires the work vehicle data including the dimensions of the excavator 3 and the movable range of the working machine 10 from the storage unit 608 or the input device 65. In order for the imaging device 63 to be disposed in the specified relative position to the excavator 3 when the outline of the vehicle body 20 coincides with the guide line 70 on the display screen of the display device 64, the second display control unit 605B displays the guide line 70 based on the work vehicle data acquired by the work vehicle data acquisition unit 609, for example. Therefore, by bringing the outline of the vehicle body 20 into coincidence with the guide line 70 on the display screen of the display device 64, the relative position of the imaging device 63 to the excavator 3 can be fixed at all times in the imaging of the excavator 3, and the imaging condition can be fixed even when a different worker Mb takes images or imaging timing is different.

In the present embodiment, the size (dimensions) and shape of the guide line 70 are determined so that the outline of the vehicle body 20 imaged by the imaging device 63 at a distance of about 10 [m], the specified distance, from the excavator 3 on the left side of the idler wheel 26, the specific part of the vehicle body 20, coincides with the guide line 70 on the display screen of the display device 64. When the imaging device 63 is disposed on the left side of the idler wheel 26 at the specified distance from the excavator 3, the outline of the vehicle body 20 coincides with the guide line 70 on the display screen of the display device 64.

In the present embodiment, the second display control unit 605B displays the guide line 70 on the display screen of the display device 64, based on the movable range of the working machine 10 included in the work vehicle data so that when positioning is performed so that the outline of the vehicle body 20 coincides with the guide line 70 on the display screen of the display device 64, the entire excavator 2, specifically, at least the upper swing body 21 and the working machine 10 are captured by the imaging device 63 and displayed on the display screen of the display device 64.

Specifically, the second display control unit 605B displays the guide line 70 in such a display form that when the imaging device 63 is positioned so that the outline of the vehicle body 20 coincides with the guide line 70 on the display screen of the display device 64, even when the working machine 10 moves to a limit position in the movable range of the working machine 10, the entire excavator 3 including the working machine 10 is imaged by the imaging device 63 and displayed on the display screen of the display device 64. In other words, the guide line 70 is displayed on the display device 64 so that when positioning is performed so that the outline of the vehicle body 20 coincides with the guide line 70 on the display screen, even with the working machine 10 extended so that the distance between the blade edges 13B and the pivot RX becomes largest, the entire excavator 3 including the working machine 10 is imaged by the imaging device 63 and displayed on the display screen of the display device 64. That is, when the worker Mb positions the imaging device 63 so that the outline of the vehicle body 20 coincides with the guide line 70, checking the display screen of the display device 64 without considering the movable range of the working machine 10, the entire excavator 3 including the working machine 10 with the working machine 10 in any position can be captured by the imaging device 63. This allows the imaging device 63 to detect imaging data of the working machine 10 even when an action is performed from a state where the working machine 10 is extended, and to reliably acquire imaging data necessary for evaluation of the skill of the operator Ma or inspection of the work vehicle.

In the present embodiment, the second display control unit 605B displays the guide line 70 on the display screen of the display device 64 so that the imaging device 63 is at the specified distance from the excavator 3 when positioned so that the outline of the vehicle body 20 coincides with the guide line 70 on the display screen of the display device 64. In the present embodiment, the specified distance is larger than the maximum swing radius, that is, the movable range of the working machine 10 supported on the upper swing body 21 as described above. The maximum swing radius is a distance between the blade edges 3B and the pivot RX in a state where the working machine 10 is extended so that the distance between the blade edges 13B and the pivot RX becomes largest. Therefore, when the imaging device 63 is positioned according to the guide line 70, at least the imaging device 63 is prevented from contacting the working machine 10 even when the upper swing body 21 swings with the working machine 10 extended. For example, even when the excavator 3 is imaged using the portable device 6 with the imaging device 63, contact between the working machine 10 and the worker Mb holding the portable device 6 is prevented, and the safety of the worker Mb is secured. That is, when the worker Mb positions the imaging device 63 so that the outline of the vehicle body 20 coincides with the guide line 70, checking the display screen of the display device 64 without considering not only the range in which the working machine 1 works as the hydraulic cylinders extend and contract (the movable range of the working machine 10) but also the movable range of the working machine 10 as the upper swing body 21 swings, the entire excavator 3 including the working machine 10 can be captured by the imaging device 63 with safety secured even if the upper swing body 21 (the working machine 10) swings unintentionally. Therefore, the guide line 70 is fixed in the size (dimensions) and position to be displayed on the display screen of the display device 64, based on the work vehicle data including the dimensions of the excavator 3 and the movable range of the working machine 10.

The determination unit 611 performs image processing on imaging data of the vehicle body 20 to determine whether the vehicle body 20 included in the imaging data has been positioned according to the guide line 70 or not. In this case, it may determine whether or not at least the outline of the upper swing body 21 included in the imaging data has been positioned according to the outline of the upper swing body 21 indicated by the guide line 70. When focusing of the optical system of the imaging device 63 is performed in image mapping, numerical values for determination are obtained. Based on the numerical values, the determination unit 611 determines whether the vehicle body 20 has been positioned according to the guide line 70 or not.

When the determination unit 611 determines that the imaging device 63 has been moved away from the excavator 3 by the specified distance on the left side of the idler wheel 26, the specific part, and has been positioned so that the outline of the vehicle body 20 coincides with the guide line 70 on the display screen of the display device 64, and the imaging device 63 has been disposed in the specified relative position to the excavator 3, the fourth display control unit 605D displays on the display device 64 the positioning status data 71 indicating that the imaging device 63 has been disposed in the specified relative position to the excavator 3 and the vehicle body 20 has been positioned according to the guide line 70. In the present embodiment, a mark 71 in a first specific color (e.g., red) indicating that the imaging device 63 has been disposed in the specified relative position to the excavator 3 and the vehicle body 20 has been positioned according to the guide line 70 is displayed on the display device 64.

On the other hand, when it is determined that the outline of the vehicle body 20 does not coincide with the guide line 70 on the display screen of the display device 64, and the imaging device 63 has not been disposed in the specified relative position to the excavator 3, as illustrated in FIG. 9, the fourth display control unit 605D displays on the display device 64 positioning status data 72 indicating that the imaging device 63 has not been disposed in the specified relative position to the excavator 3. In the present embodiment, a mark 72 in a second specific color (e.g., blue) indicating that the imaging device 63 has not been disposed in the specified relative position to the excavator 3 is displayed on the display device 64. For the positioning status data 71, 72, instead of changing the specific colors or with the change of the specific colors, positioning status data may be switched from blinking to illumination for display, for example, to indicate that the imaging device 63 has been disposed in the specified relative position to the excavator 3.

While the mark 72 is displayed, the imaging device 63 is in an imaging restricted state, in which the detected data acquisition unit 601 is restricted in the acquisition of imaging data of the excavator 3. When the mark 71 is displayed, the imaging device 63 is in an imaging enabled state, in which the detected data acquisition unit 601 can acquire imaging data of the excavator 3.

When the determination unit 611 determines that the imaging device 63 has been disposed in the specified relative position to the excavator 3, the guide line 70 may be displayed in a third specific color (e.g., green). When the determination unit 611 determines that the imaging device 63 has not been disposed in the specified relative position to the excavator 3, the guide line 70 may be displayed in a fourth specific color (e.g., red). Instead of changing the specific colors of the guide line 70, or with the change of the specific colors, the guide line 70 may be switched from blinking to illumination for display, for example, to indicate that the imaging device 63 has been disposed in the specified relative position to the excavator 3.

In an example illustrated in FIG. 8, the idler wheels 26 are disposed forward of the upper swing body 21, the drive wheels 25 are disposed rearward, and a position where the imaging device 63 is at the specified distance from the excavator 3 on the left side of the idler wheel 26 is the specified imaging position. In a state where the drive wheels 25 are disposed forward of the upper swing body 21 and the idler wheels 26 are disposed rearward, a position where the imaging device 63 is at the specified distance from the excavator 3 on the left side of the drive wheel 25 is the specified imaging position.

After the imaging position is determined, processing to identify the position of the upper swing body 21 is performed. The position data calculation unit 602 identifies the position of the upper swing body 21, using a pattern matching method. After the position of the upper swing body 21 is identified, the position data calculation unit 602 identifies the position of the working machine 10 with the working machine 10 at rest. The identification of the position of the working machine 10 includes identification of the position of the blade edges 13B of the bucket 13.

(Imaging and Evaluation)

When the position of the working machine 10 is identified, the portable device 6 transitions to an imaging and evaluation mode. In the imaging and evaluation mode also, the zooming function of the optical system of the imaging device 63 is restricted. The excavator 3 is imaged by the imaging device 63 with a fixed specified imaging magnification. The fixed specified imaging magnification in the imaging preparation mode is equal to the fixed specified imaging magnification in the imaging and evaluation mode.

The operator Ma starts the operation of the operating device 8, and the imaging device 63 of the portable device 6 images the movement of the working machine 10 of the excavator 3. In the present embodiment, a condition of the operation of the working machine 10 by the operator Ma is given to the operator Ma as a task so that the working machine 10 moves under a specific travel condition in the evaluation of the operator Ma.

In the present embodiment, as a task given to the operator Ma, for example, an operating condition of operating the working machine 10 so that the blade edges 13B of the bucket 13 in an unloaded state draw a linear travel locus along a horizontal plane in the air is imposed on the operator Ma. The operator Ma operates the operating device 8 so that the blade edges 13B of the bucket 13 draw a linear travel locus along a horizontal plane.

Figure 10:
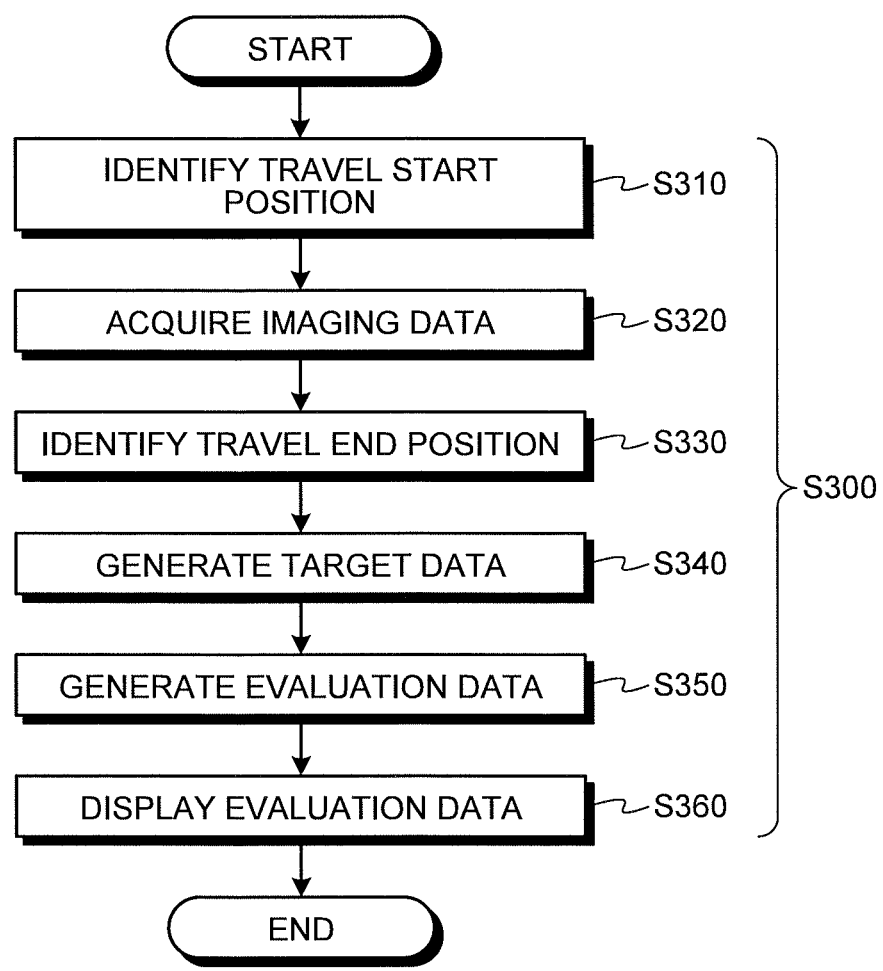
FIG. 10 is a flowchart illustrating an example of an imaging and evaluation method according to the embodiment.

FIG. 10 is a flowchart illustrating an example of an imaging and evaluation method according to the present embodiment. The imaging and evaluation method according to the present embodiment includes a step of identifying a travel start position of the working machine 10 (S310), a step of acquiring imaging data of the working machine 10 traveling (S320), a step of identifying a travel end position of the working machine 10 (S330), a step of generating target data of the working machine 10 (S340), a step of generating evaluation data of the operator Ma based on the imaging data and the target data (S350), and a step of displaying the evaluation data on the display device 64 (S360).

Processing to identify a travel start position and a travel start time of the bucket 13 of the working machine 10 is performed (step S310). The detected data acquisition unit 601 identifies the position of the blade edges 13B of the bucket 13 of the working machine 10 at rest, based on imaging data of the working machine 10 taken by the imaging device 63. When the detected data acquisition unit 601 determines that time for which the blade edges 13B of the bucket 13 have been at rest is a specified time or more, it sets the position of the blade edges 13B of the bucket 13 as a travel start position SP of the bucket 13.

When the bucket 13 at rest starts to travel by the operation of the operator Ma, the detected data acquisition unit 601 detects the start of the travel of the bucket 13, based on imaging data of the working machine 10. The detected data acquisition unit 601 determines that a point in time at which the blade edges 13B of the bucket 13 at rest have started to travel is the travel start time of the bucket 13.

When the travel of the bucket 13 is started, the detected data acquisition unit 601 acquires imaging data, moving image data of the working machine 10, from the imaging device 63 (step S320).

In the present embodiment, the detected data acquisition unit 601 acquires detected data including the travel locus of the working machine 10, based on imaging data of the bucket 13 from the travel start position to the travel end position. In the present embodiment, detected data includes the travel locus of the working machine 10 in an unloaded state in the air from when the working machine 10 at rest starts to travel at the travel start position to when it ends the travel at the travel end position. The detected data acquisition unit 601 acquires the travel locus of the bucket 13 based on imaging data. The detected data acquisition unit 601 also acquires elapsed time since the start of travel of the bucket 13, based on imaging data.

Figure 11:
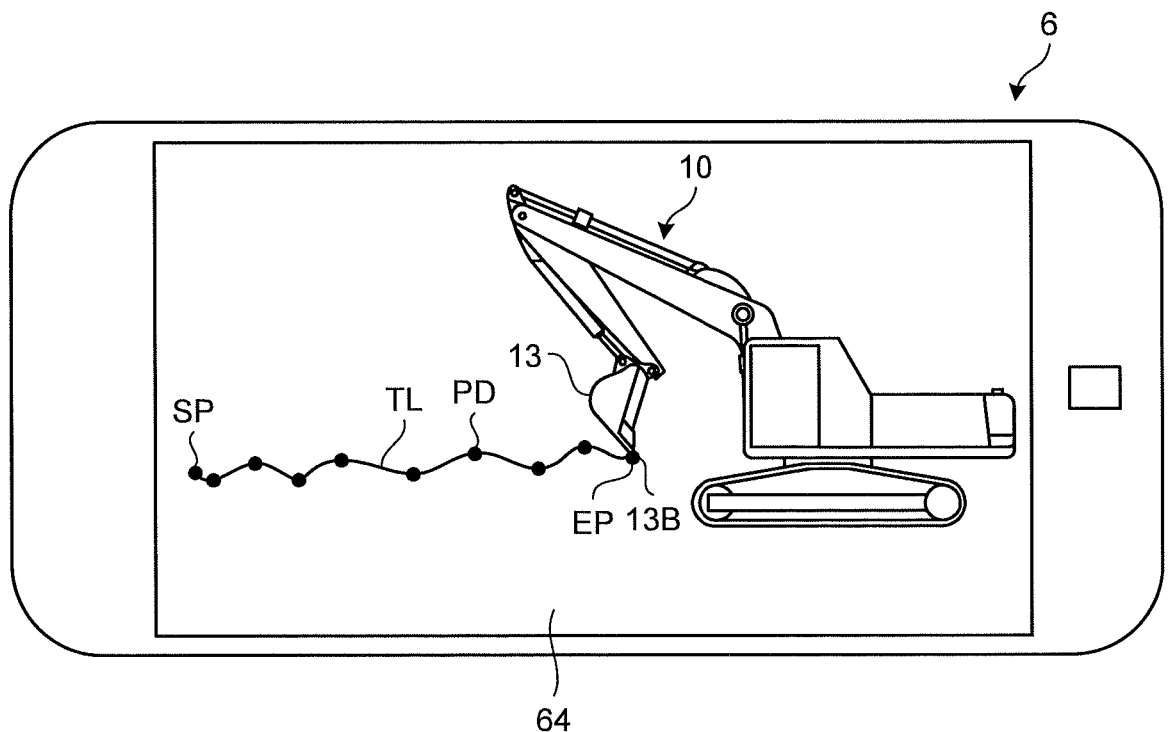
FIG. 11 is a diagram for explaining a method of determining a travel end position of a working machine according to the embodiment.

FIG. 11 illustrates the display device 64 immediately after the start of travel of the bucket 3. When the detected data acquisition unit 601 determines that the travel of the bucket 13 has been started, the display control unit 605 displays display data indicating the blade edges 13P of the bucket 13 on the display device 64. In the present embodiment, the display control unit 605 displays plots PD, display data indicating the blade edges 13P, on the display device 64.

The detected data acquisition unit 601 continues to calculate position data of the bucket 13 based on imaging data, acquiring the travel locus of the blade edges 13B of the bucket 13. The detected data acquisition unit 601 also acquires elapsed time indicating the travel time of the bucket 13 since the travel start time.

The display control unit 605 generates display data to indicate the travel locus of the bucket 13 from the detected data for display on the display device 64. The display control unit 605 generates the plots PD indicating the position of the blade edges 13B of the bucket 13 at regular time intervals, based on the detected data. The display control unit 605 displays the plots PD generated at the regular time intervals on the display device 64. In FIG. 11, a short interval between the plots PD indicates a low travel speed of the bucket 13, and a long interval between the plots PD indicates a high travel speed of the bucket 13.

The display control unit 605 displays a detected line TL indicating the travel locus of the bucket 13 on the display device 64, based on the plots PD. The detected line TL is display data connecting the plots PD in a curved shape.

When the bucket 13 in a moving state stops traveling by the operation of the operator Ma, processing to identify a travel end position and a travel end time of the bucket 13 of the working machine 10 is performed (step S330).

When the bucket 13 in the moving state stops traveling by the operation of the operator Ma, the detected data acquisition unit 601 detects that the travel of the bucket 13 has been stopped, based on imaging data. The detected data acquisition unit 601 sets a position at which the blade edges 13B of the bucket 13 in the moving state have stopped traveling as the travel end position of the bucket 13. The detected data acquisition unit 601 also sets a point in time at which the blade edges 13B of the bucket 13 in the moving state have stopped traveling as the travel end time of the bucket 13. When the detected data acquisition unit 601 determines that the bucket 13 in the moving state has stopped traveling, and time for which the blade edges 13B of the bucket 13 have been at rest is a specified time or more, it sets the position of the blade edges 13B of the bucket 13 as the travel end position of the bucket 13.

Figure 12:
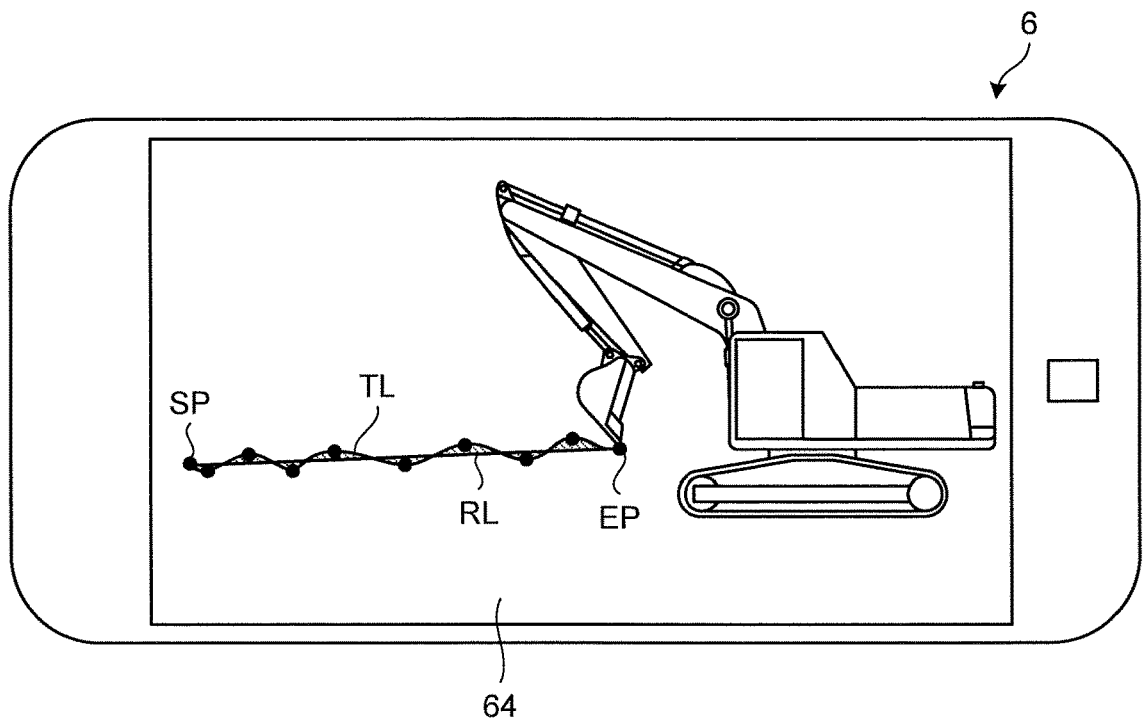
FIG. 12 is a diagram for explaining a method of generating target data that indicates a target travel locus of the working machine according to the embodiment.

After the travel of the working machine 10 is stopped, processing to generate target data indicating a target travel locus of the working machine 10 is performed (step S340). FIG. 12 is a diagram for explaining a method of generating target data indicating a target travel locus of the working machine 10 according to the present embodiment. The target data generation unit 603 generates target data indicating a target travel locus of the bucket 13.

In the present embodiment, the target travel locus includes a straight line connecting the travel start position SP and the travel end position EP.

As illustrated in FIG. 12, the display control unit 605 generates display data to be displayed on the display device 64 from the target data for display on the display device 64. In the present embodiment, the display control unit 605 displays a target line RL indicating the target travel locus connecting the travel start position SP and the travel end position EP on the display device 64. The target line RL is display data in a linear shape connecting the travel start position SP and the travel end position EP.

The display control unit 605 displays the plots PD and the detected line TL together with the target line RL on the display device 64. Thus, the display control unit 605 generates display data including the plots PD and the detected line TL from the detected data, and generates display data including the target line RL from the target data for display on the display device 64.

By the detected line TL and the target line RL being displayed on the display device 64 at the same time, the worker Mb or the operator Ma can recognize how far the actual travel locus of the bucket 13 deviates from the target travel locus indicated by a straight line.

After the detected data including the travel locus is acquired, and the target data including the target travel locus is generated, processing to generate evaluation data of the operator Ma is performed, based on the detected data and the target data (step S350).

The evaluation data generation unit 604 generates evaluation data of the operator Ma, based on a difference between the travel locus and the target travel locus. A smaller difference between the detected travel locus and the target travel locus means that the bucket 13 could be moved along the target travel locus, and the skill of the operator Ma is evaluated to be high. On the other hand, a larger difference between the travel locus and the target travel locus means that the bucket 13 could not be moved along the target travel locus, and the skill of the operator Ma is evaluated to be low.

In the present embodiment, the evaluation data generation unit generates evaluation data, based on the area of a plane defined by the detected line TL indicating the travel locus and the target line RL indicating the target travel locus. Specifically, as illustrated by hatched portions in FIG. 12, the area of planes defined by the detected line TL illustrated entirely by a curved line, and the target line RL illustrated by a straight line is calculated, and evaluation data is generated based on the area. The smaller the area, the higher the skill of the operator Ma is evaluated to be. The larger the area, the lower the skill of the operator Ma is evaluated to be.

In the present embodiment, the travel start position SP and the travel end position EP are identified based on the imaging data. The detected data acquisition unit 601 acquires the distance between the travel start position SP and the travel end position EP, based on the imaging data. In the present embodiment, the detected data acquired by the detected data acquisition unit 601 includes the travel distance of the bucket 13 between the travel start position SP and the travel end position EP.

The evaluation data generation unit 604 generates evaluation data, based on the distance between the travel start position SP and the travel end position EP. A longer distance between the travel start position SP and the travel end position EP means that the bucket 13 could be moved along the target travel locus for a longer distance, and the skill of the operator Ma is evaluated to be high. A shorter distance between the travel start position SP and the travel end position EP means that the bucket 13 could be moved along the target travel locus only for a shorter distance, and the skill of the operator Ma is evaluated to be low.

In the present embodiment, elapsed time since the start of travel of the bucket 13, and travel time of the bucket 13 between the travel start position SP and the travel end position EP are acquired, based on the imaging data. The detected data acquisition unit 601 has an internal timer. The detected data acquisition unit 601 acquires time between the travel start time and the travel end time of the bucket 13, based on the measurement result of the internal timer and the imaging data of the imaging device 63. In the present embodiment, the detected data acquired by the detected data acquisition unit 601 includes travel time of the bucket 13 between the travel start time SP and the travel end time.

The evaluation data generation unit 604 generates evaluation data, based on the travel time of the bucket 13 between the travel start time and the travel end time. A shorter time between the travel start time and the travel end time means that the bucket 13 could be moved along the target travel locus in a shorter period of time, and the skill of the operator Ma is evaluated to be high. A longer time between the travel start time and the travel end time means that it took a longer period of time to move the bucket 13 along the target travel locus, and the skill of the operator Ma is evaluated to be low.

The detected data acquisition unit 601 calculates an actual travel distance of the bucket 13 between the travel start position SP and the travel end position EP as described above. Therefore, the detected data acquisition unit 601 can calculate the travel speed (average travel speed) of the bucket 13 between the travel start position SP and the travel end position EP, based on the actual travel distance of the bucket 13 between the travel start position SP and the travel end position EP, and the travel time of the bucket 13 between the travel start time and the travel end time. In the present embodiment, the detected data acquired by the detected data acquisition unit 601 includes the travel speed of the bucket 13 between the travel start position SP and the travel end position EP.

The evaluation data generation unit 604 generates evaluation data, based on the travel speed of the bucket 13 between the travel start position SP and the travel end position EP. A higher travel speed of the bucket 13 between the travel start position SP and the travel end position EP means that the bucket 13 could be moved along the target travel locus at a higher speed, and the skill of the operator Ma is evaluated to be high. A lower travel speed of the bucket 13 between the travel start position SP and the travel end position EP means that the bucket 13 could be moved along the target travel locus only at a lower speed, and the skill of the operator Ma is evaluated to be low.

Figure 13:
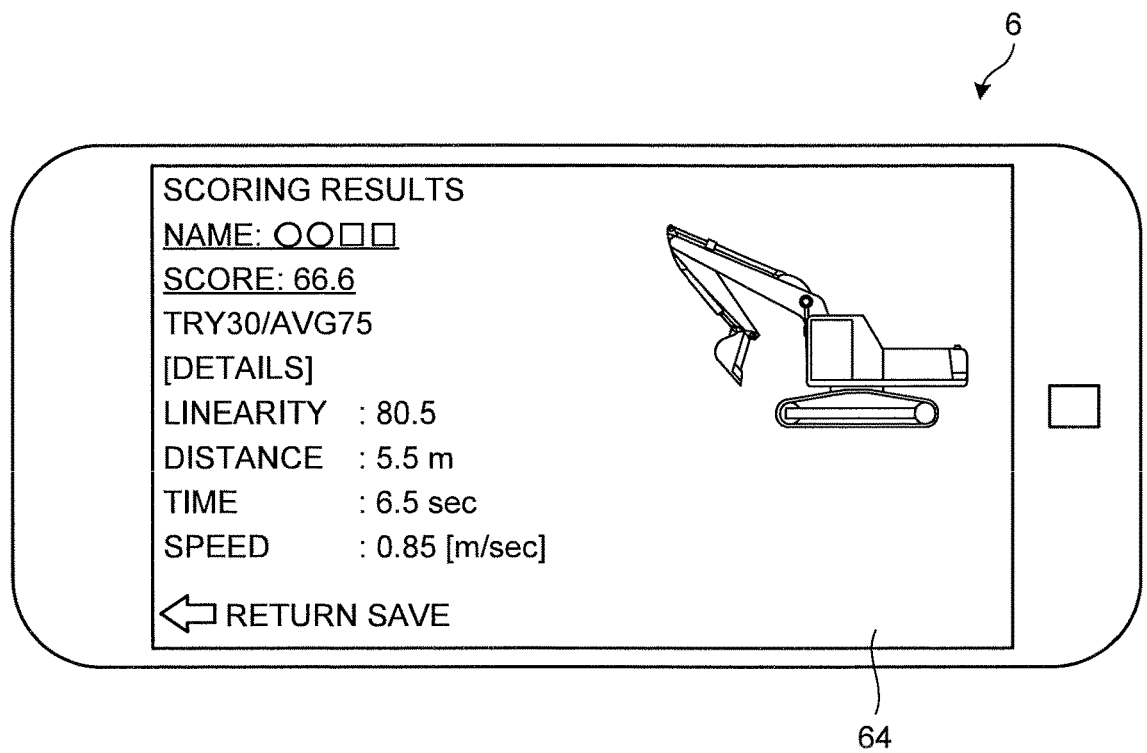
FIG. 13 is a diagram for explaining a method of displaying evaluation data according to the embodiment.

After the evaluation data is generated, processing to display the evaluation data on the display device 64 is performed (step S360). FIG. 13 is a diagram for explaining a method of displaying evaluation data according to the present embodiment. The display control unit 605 generates display data from the evaluation data for display on the display device 64.

As illustrated in FIG. 13, the display control unit 605 displays the name of the operator Ma, personal data, on the display device 64. The display control unit 605 also displays, as evaluation data, items "Linearity" indicating the difference between the target travel locus and the detected travel locus, "Distance" indicating the travel distance of the bucket 13 between the travel start position SP and the travel end position EP, "Time" indicating the travel time of the bucket 13 between the travel start position SP and the travel end position EP, and "Speed" indicating the average travel speed of the bucket 13 between the travel start position SP and the travel end position EP, on the display device 64. The display control unit 605 also displays numerical data of the items "Linearity," "Distance," "Time," and "Speed" on the display device 64. The display control unit 605 also displays a score of the skill of the operator Ma on the display device 64.

Reference data on skill is stored in the storage unit 608. Reference data is, for example, evaluation data on an operator having average skill, and is determined statistically or empirically. The score of the skill of the operator Ma is calculated with the reference data as a reference.

<Function and Effect>

As described above, according to the present embodiment, the evaluation device 600 includes the first display control unit 605A for displaying imaging data on the display screen of the display device 64, and the second display control unit 605B for displaying the guide line 70 in the display form in which the size (dimensions) and position thereof are fixed on the display screen of the display device 64 based on the work vehicle data on the display screen of the display device 64. The second display control unit 605B displays the guide line 70 on the display screen of the display device 64 so that the entire excavator 3 is displayed on the display screen of the display device 64 when the vehicle body 20 is positioned according to the guide line 70 on the display screen of the display device 4. This allows the imaging device 63 or the worker Mb, a person taking images, to be guided to a proper imaging position to evaluate the skill of the operator Ma to operate the excavator 3 or to inspect the excavator 3 based on imaging data of the excavator 3 acquired by the imaging device 63. According to the present embodiment, when the movement of the working machine 10 of the excavator 3 is imaged, the safety of a person taking images (the worker Mb) can be secured, contact between the imaging device 63 and the working machine 10 can be avoided, and the position of the person who takes images or the imaging device 63 does not vary depending on imaging timing or from person to person taking images, so that imaging can be performed in a proper imaging position. As a result, the evaluation of the operator Ma or the inspection of the excavator 3 can be performed properly, based on imaging data of the entire excavator 3 imaged by the imaging device 63 positioned in a proper imaging position.

Further, according to the present embodiment, the second display control unit 605B displays the guide line 70 on the display screen of the display device 64 in such a display form that when the vehicle body 20 is positioned according to the guide line 70 on the display screen of the display device 64, even when the working machine 10 moves to a limit position in the movable range, the entire excavator 3 is displayed on the display screen of the display device 64. Therefore, even when the working machine 10 relatively movable to the vehicle body 20 moves to a limit position in the movable range, the imaging device 63 can acquire imaging data of the working machine 10 from a state where the working machine 10 has been extended or imaging data of the working machine 10 to a state where the working machine 10 is extended.

Further, according to the present embodiment, the second display control unit 605B displays the guide line 70 on the display screen of the display device 64 in such a display form that when the vehicle body 20 is positioned according to the guide line 70 on the display screen of the display device 64, the imaging device 63 is at a specified distance from the excavator 3. By setting dimensions of the display form of the guide line 70 on the display screen of the display device 64 so that when the vehicle body 20 is positioned according to the guide line 70 on the display screen of the display device 64, the imaging device 63 is at the specified distance from the excavator 3, contact between the imaging device 63 and the working machine 10 is avoided, and contact between the worker Mb, a person taking images, and the working machine 10 is prevented when the person taking images takes images, holding the imaging device 63, so that the safety of the worker Mb, a person taking images, can be secured.

Further, according to the present embodiment, the specified distance is larger than the maximum swing radius of the working machine 10 supported on the upper swing body 21. Therefore, if the upper swing body 21 swings during imaging, contact between the imaging device 63 and the working machine 10 is avoided, and contact between the worker Mb, a person taking images, and the working machine 10 is prevented when the person taking images takes images, holding the imaging device 63, so that the safety of the worker Mb, a person taking images, can be secured.

Further, according to the present embodiment, the guide line 70 indicates the outline of the vehicle body 20 viewed from the left side when the upper swing body 21 and the lower traveling body 22 are positioned so that the rotation axes AX1, AX2, and AX3 of the working machine 10 and the rotation axes DX1 and DX2 of the lower traveling body 22 are parallel in space. Therefore, preparation of one type of guide line 70 to be a reference enables positioning of the vehicle body 20 according to the guide line 70. That is, for example, a guide line indicating the outline of the vehicle body 20 viewed from the right side, a guide line indicating the outline of the vehicle body 20 viewed from the diagonally forward left, or the like are not necessary. It is only necessary to prepare only a guide line indicating the outline of the vehicle body 20 viewed from the left side, based on known dimensional data or the like of the excavator 3.

Further, according to the present embodiment, the guide line 70 indicates the outline of the vehicle body 20 viewed from the left side. This ensures the visibility of the actual vehicle body 20 displayed on the display screen of the display device 64, so that the worker Mb, a person taking images, can move to a proper imaging position, seeing the actual vehicle body 20 and the guide line 70 displayed on the display screen of the display device 64.

Further, according to the present embodiment, the evaluation device 600 has the third display control unit 605C for displaying on the display device 64 the instruction data 75 to give instructions to move the imaging device 63 away from the excavator 3 by a specified distance, for example, about 10 [m], on the left side of the idler wheel 26, a specific part of the vehicle body 20. Therefore, the worker Mb, a person taking images, can move to a proper imaging position promptly, seeing the instruction data 75 displayed on the display screen of the display device 64.

Further, according to the present embodiment, the evaluation device 600 has the determination unit 611 for performing image processing on imaging data of the vehicle body 20 to determine whether the vehicle body 20 has been positioned according to the guide line 70 or not, and the fourth display control unit 605D for displaying the positioning status data 71 indicating that positioning has been done when the determination unit 611 determines that positioning has been done, on the display device 64. The worker Mb, a person taking images, can recognize whether the vehicle body 20 has been positioned according to the guide line 70 or not, seeing the positioning status data 71 displayed on the display screen of the display device 64.

Further, in the present embodiment, the evaluation device 600 includes the detected data acquisition unit 601 for acquiring imaging data including the moving state of the working machine 10, the target data generation unit 603 for generating target data including a target travel condition of the working machine 10, and the evaluation data generation unit 604 for generating evaluation data of the operator Ma based on the detected data and the target data. Therefore, the skill of the operator Ma of the excavator 3 can be evaluated objectively and quantitatively. Provision of evaluation data increases a desire of the operator Ma to improve his or her skill. Further, the operator Ma can improve the operation by him or her, based on the evaluation data.

Other Embodiments

In the above-described embodiment, a load lifting work to lift a load using the working machine 10 of the excavator 3 may be performed. Movement data of the working machine 10 during the load lifting work may be imaged by the imaging device 63 to evaluate the skill of the operator Ma based on the movement data.

In the above-described embodiment, the moving state of the working machine 10 is evaluated. At least one of the excavation amount and the excavation time of the bucket 13 may be evaluated based on imaging data of the imaging device 63.

In the above-described embodiment, the skill of the operator Ma is evaluated based on imaging data of the working machine 10. The working condition of the working machine 10 may be evaluated based on imaging data of the working machine 10. For example, inspection processing to determine whether the working condition of the working machine 10 is normal or not may be performed, based on imaging data of the working machine 10.

In the above-described embodiment, the work vehicle 3 is the excavator 3. The work vehicle 3 is applicable to a work vehicle having a working machine capable of moving relatively to the vehicle body, such as a bulldozer, a wheel loader, and a forklift.

REFERENCE SIGNS LIST

1 EVALUATION SYSTEM
2 CONSTRUCTION SITE
3 EXCAVATOR (WORK VEHICLE)
3C EXCAVATOR (WORK VEHICLE)
6 PORTABLE DEVICE
7 DRIVER'S SEAT
8 OPERATING DEVICE
8WR RIGHT WORKING LEVER
8WL LEFT WORKING LEVER
8MR RIGHT TRAVELING LEVER
8ML LEFT TRAVELING LEVER
10 WORKING MACHINE
11 BOOM
11P BOOM PIN
12 ARM
12P ARM PIN
13 BUCKET
13B BLADE EDGE
13K OPENING END
13P BUCKET PIN
14 BOOM CYLINDER
15 ARM CYLINDER
16 BUCKET CYLINDER
20 VEHICLE BODY
21 UPPER SWING BODY
22 LOWER TRAVELING BODY
23 CAB
24 COUNTERWEIGHT
25 DRIVE WHEEL
26 IDLER WHEEL

27 BELT
60 PROCESSING DEVICE (EVALUATION DEVICE)
61 STORAGE DEVICE
62 POSITION DETECTION DEVICE
63 IMAGING DEVICE
64 DISPLAY DEVICE
65 INPUT DEVICE
66 INPUT-OUTPUT INTERFACE DEVICE
70 GUIDE LINE
71 MARK
72 MARK
600 EVALUATION DEVICE
601 DETECTED DATA ACQUISITION UNIT
602 POSITION DATA CALCULATION UNIT
603 TARGET DATA GENERATION UNIT
604 EVALUATION DATA GENERATION UNIT
605A FIRST DISPLAY CONTROL UNIT
605B SECOND DISPLAY CONTROL UNIT
605C THIRD DISPLAY CONTROL UNIT
605D FOURTH DISPLAY CONTROL UNIT
608 STORAGE UNIT
AX1 ROTATION AXIS
AX2 ROTATION AXIS
AX3 ROTATION AXIS
CA ICON
CB ICON
DX1 ROTATION AXIS
DX2 ROTATION AXIS
EP TRAVEL END POSITION
Ma OPERATOR
Mb WORKER
MD CHARACTER DATA
PD PLOT
PM PLOT
RL TARGET LINE
RX PIVOT
SP TRAVEL START POSITION
TD ELAPSED TIME DATA
TL DETECTED LINE

The invention claimed is:

1. An evaluation device comprising:
a first display control unit that displays imaging data acquired by an imaging device on a display screen of a display device; and
a second display control unit that displays on the display screen a guide display, which is based on one or more physical or operational characteristics of a work vehicle from work vehicle data for the work vehicle imaged or to be imaged by the imaging device, to determine an imaging position of the imaging device relative to the work vehicle,
wherein the imaging device is portable and separately located from the work vehicle, and
wherein the second display control unit displays the guide display in such a display form that when a vehicle body of the work vehicle is positioned according to the guide display on the display screen, all of the work vehicle can be imaged by the imaging device even when a working machine of the work vehicle moves to a limit position in a movable range,
wherein the guide display is displayed in such a display form that when a vehicle body of the work vehicle is positioned according to the guide display on the display screen, an imaging position of the imaging device is performed at a proper imaging position and under a specific imaging condition including at a specified distance from the work vehicle.

2. The evaluation device according to claim 1, wherein the vehicle body includes an upper swing body and a lower traveling body, and
the specified distance is larger than a maximum swing radius of a working machine of the work vehicle.

3. The evaluation device according to claim 1, wherein the guide display indicates an outline of a vehicle body of the work vehicle when the vehicle body is viewed from a side.

4. The evaluation device according to claim 1, further comprising:
a determination unit that determines whether or not a vehicle body of the work vehicle indicated by the imaging data displayed on the display screen has been positioned according to the guide display displayed on the display screen; and
a fourth display control unit that displays on the display screen positioning status data indicating that the positioning has been done when the determination unit determines that the positioning has been done.

5. The evaluation device according to claim 1, wherein the guide display comprises a guide line or figure indicating a shape of a vehicle body of the work vehicle including the outline of the vehicle body, and the imaging data includes an image of the vehicle body of the work vehicle which is captured by the imaging device and is displayed on the display screen along with the guide display.

6. The evaluation device according to claim 5, wherein a position of the imaging device is adjusted until the displayed imaging data of the vehicle body of the work vehicle is aligned with the guide display on the display screen.

7. The evaluation device according to claim 1, comprising a portable computer including the imaging device, the display device and the first and second display control units.

8. The evaluation device according to claim 1, wherein the guide display is a guide display to determine an imaging position of the imaging device when the work vehicle is imaged from a side by the imaging device.

9. The evaluation device according to claim 1, wherein the work vehicle data comprises a size or dimension of the work vehicle, or a movable range of a working machine of the work vehicle relative to a vehicle body of the work vehicle.

10. The evaluation device according to claim 1, wherein a position or dimension of the guide display on the display screen is based on one or more physical or operational characteristics of a work vehicle.

11. The evaluation device according to claim 1, wherein the guide display is displayed on the display screen in a form in which the size and position thereof are fixed on the display screen.

12. A computer program product having a non-transitory computer readable medium including programmed instructions, wherein the instructions, when executed by a computer, cause the computer to perform:
displaying imaging data acquired by an imaging device on a display screen of a display device; and
displaying on the display screen a guide display, which is based on one or more physical or operational characteristics of a work vehicle from work vehicle data for the work vehicle imaged or to be imaged by the imaging device, to determine an imaging position of the imaging device relative to the work vehicle,
wherein the imaging device is portable and separately located from the work vehicle, and
wherein the guide display is displayed in such a display form that when a vehicle body of the work vehicle is positioned according to the guide display on the display screen, all of the work vehicle can be imaged by the imaging device even when a working machine of the work vehicle moves to a limit position in a movable range, wherein the displaying on the display screen the guide display includes displaying the guide display in such a display form that when a vehicle body of the work vehicle is positioned according to the guide display on the display screen, an imaging position of the imaging device is performed at a proper imaging position and under a specific imaging condition including at a specified distance from the work vehicle.

13. The computer program product according to claim 12, wherein the guide display is a guide display to determine an imaging position of the imaging device when the work vehicle is imaged from a side by the imaging device.

14. The computer program product according to claim 12, wherein the instructions, when executed by a computer, cause the computer to further perform:

determining whether or not a vehicle body of the work vehicle indicated by the imaging data displayed on the display screen has been positioned according to the guide display displayed on the display screen; and displaying on the display screen positioning status data indicating that the positioning has been done when the determination unit determines that the positioning has been done.

* * * * *